US012645800B2

(12) United States Patent
Abdulhamid et al.

(10) Patent No.: US 12,645,800 B2
(45) Date of Patent: Jun. 2, 2026

(54) METHOD AND SYSTEM FOR PATCHING A BOOT PROCESS

(71) Applicant: Ampere Computing LLC, Santa Clara, CA (US)

(72) Inventors: Harb Abdulhamid, Raleigh, NC (US); Scott Walton, Linn, OR (US); Kha Nguyen, San Jose, CA (US)

(73) Assignee: Ampere Computing LLC, Santa Clara, CA (US)

( * ) Notice: Subject to any disclaimer, the term of this patent is extended or adjusted under 35 U.S.C. 154(b) by 10 days.

(21) Appl. No.: 17/809,889

(22) Filed: Jun. 29, 2022

(65) Prior Publication Data

US 2024/0005004 A1      Jan. 4, 2024

(51) Int. Cl.
*G06F 9/00* (2018.01)
*G06F 8/65* (2018.01)
*G06F 15/177* (2006.01)
*G06F 21/57* (2013.01)

(52) U.S. Cl.
CPC .............. *G06F 21/572* (2013.01); *G06F 8/66* (2013.01); *G06F 21/575* (2013.01); *G06F 2221/033* (2013.01)

(58) Field of Classification Search
CPC ............................ G06F 21/572; G06F 21/575
See application file for complete search history.

(56) References Cited

U.S. PATENT DOCUMENTS 11,228,421 B1 * 1/2022 Mesh ...................... G06F 21/36
11,488,176 B2 * 11/2022 Padmanabhan ....... G06F 16/953
2002/0152382 A1 * 10/2002 Xiao ...................... G06F 21/604
                                                                    713/173
2016/0232356 A1 * 8/2016 Barkelew .............. G06F 9/4401
2017/0090909 A1 * 3/2017 Guo ........................... G06F 8/66
2017/0093582 A1 * 3/2017 Keidar .................. G06F 9/4416
2018/0375852 A1 * 12/2018 Thom ................. H04L 63/0272
2019/0057214 A1 * 2/2019 Xia ........................ H04W 12/06
2019/0363894 A1 * 11/2019 Kumar Ujjwal ...... H04L 9/3268
2021/0334088 A1 * 10/2021 Ma .............................. G06F 8/61
2023/0008885 A1 * 1/2023 Khatri .................. G06F 21/602
2023/0078058 A1 * 3/2023 Mitchell ............... G06F 21/575
                                                                    726/22
2023/0083979 A1 * 3/2023 Mitchell ........... G06Q 10/0837
                                                                    726/26
2024/0267211 A1 * 8/2024 Shingala ................. G06F 21/44

* cited by examiner

*Primary Examiner* — Mohammed H Rehman

(74) *Attorney, Agent, or Firm* — Muncy, Geissler, Olds & Lowe, P.C.

(57) ABSTRACT

A system and method are provided that enable a processor to have the immutable code and data that it uses for its boot process to be securely patched. A system may include a read only memory (ROM) storing one or more certificates and instructions, an array of one-time programmable (OTP) indicators, a bootstrap controller connected to the ROM and the array of OTP indicators, and a random access memory (RAM) connected to the bootstrap controller. The bootstrap controller is configured to verify integrity of firmware for boot based on certificates stored in ROM, check for a patch in the array of OTP indicators, and write the one or more certificates and the instructions in ROM and the patch into the RAM. The patch may be loaded into RAM by the bootstrap controller and overwrite ROM instructions or certificates in RAM.

16 Claims, 8 Drawing Sheets

RAM 240

700

| Field | Length | Offset | Description |
|-------|--------|--------|-------------|
| Patch Header | 4 bytes | 0 | Bits 0:7 – Patch Length (in 16-bit half words)<br><br>Bits 7:15 – NOP fill count (after the patch operating instructions)<br><br>Bits 16:31 – Patch TCM offset (in 16-bit half words) |
| Patch Payload | 0-254 bytes | 4 | Instructions to replace the contents in RAM or I-TCM at the offset specified in the header. |

Verify integrity of firmware for boot based on certificates and instructions stored in read only memory (ROM)

804

Check for a patch in an array of one-time programmable (OTP) indicators

806

Write the certificates and the instructions stored in the ROM into random access memory (RAM)

808

Write the patch stored in the array of OTP indicators into RAM

900

METHOD AND SYSTEM FOR PATCHING A BOOT PROCESS

BACKGROUND

I. Field of the Disclosure

The technology of the disclosure relates to a secure boot process and techniques for updating the process.

II. Background

Recent hardware and firmware exploits of cloud computing assets have exposed the vulnerability of the boot process of a computer or server to persistent and undetectable malware. These vulnerabilities manifest at various points in the boot process and exploit various ports used for testing and debug early in the implementation. Accordingly, the security of a chip, processor or central processing unit (CPU) has become an important part of device and cloud security.

In conventional implementations, a boot process begins with a launch of a basic input/output system (BIOS) which can serve as a miniature operating system and at least the beginning steps of this boot process are executed out of read-only memory (ROM). This ROM may be hardcoded in silicon such that modification after manufacture is not possible. Furthermore, changes to such a ROM would involve a redesign of the physical layout of the CPU, and may require one or more new lithographic masks, which may involve significant time and expense even where such changes are feasible. Thus, if errors or security flaws are found in the ROM instructions or data after tape-out or manufacture, changes can be costly or impossible. Where changes are not feasible, such errors or security flaws may result in relatively early retirement of affected devices in applications such as data centers and cloud computing.

Accordingly, a secure way of patching the ROM used to initialize and verify the boot process may provide significant technical advantages and prolong product use.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example implementation, a method of securely booting with patched firmware is disclosed, the method including verifying integrity of firmware for boot based on certificates and instructions stored in read only memory (ROM), checking for a patch in an array of one-time programmable (OTP) indicators, writing the certificates and the instructions stored in the ROM into random access memory (RAM), and writing the patch stored in the array of OTP indicators into RAM.

In an example implementation, an apparatus for secure boot is disclosed. The apparatus includes a read only memory (ROM) storing one or more certificates and instructions, an array of one-time programmable (OTP) indicators, a bootstrap controller connected to the ROM and the array of OTP indicators, and random-access memory (RAM) connected to the bootstrap controller. The bootstrap controller is configured to verify integrity of firmware for boot based on certificates stored in ROM, check for a patch in the array of OTP indicators, write the one or more certificates and instructions in ROM into RAM, and write the patch into the RAM.

In an example implementation, a method is disclosed for ensuring secure boot with patched firmware. The method includes asserting at least one pin on a processor which permits programming a patch for firmware during booting the processor, loading a patch certificate via an input of the processor, the patch certificate including a payload, and programming one or more one-time programmable (OTP) indicators with the patch from the payload.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

BRIEF DESCRIPTION OF THE DRAWINGS

FIG. 7 is a diagram of a patch format according to an implementation;

DETAILED DESCRIPTION OF THE DRAWINGS

Figure 1:
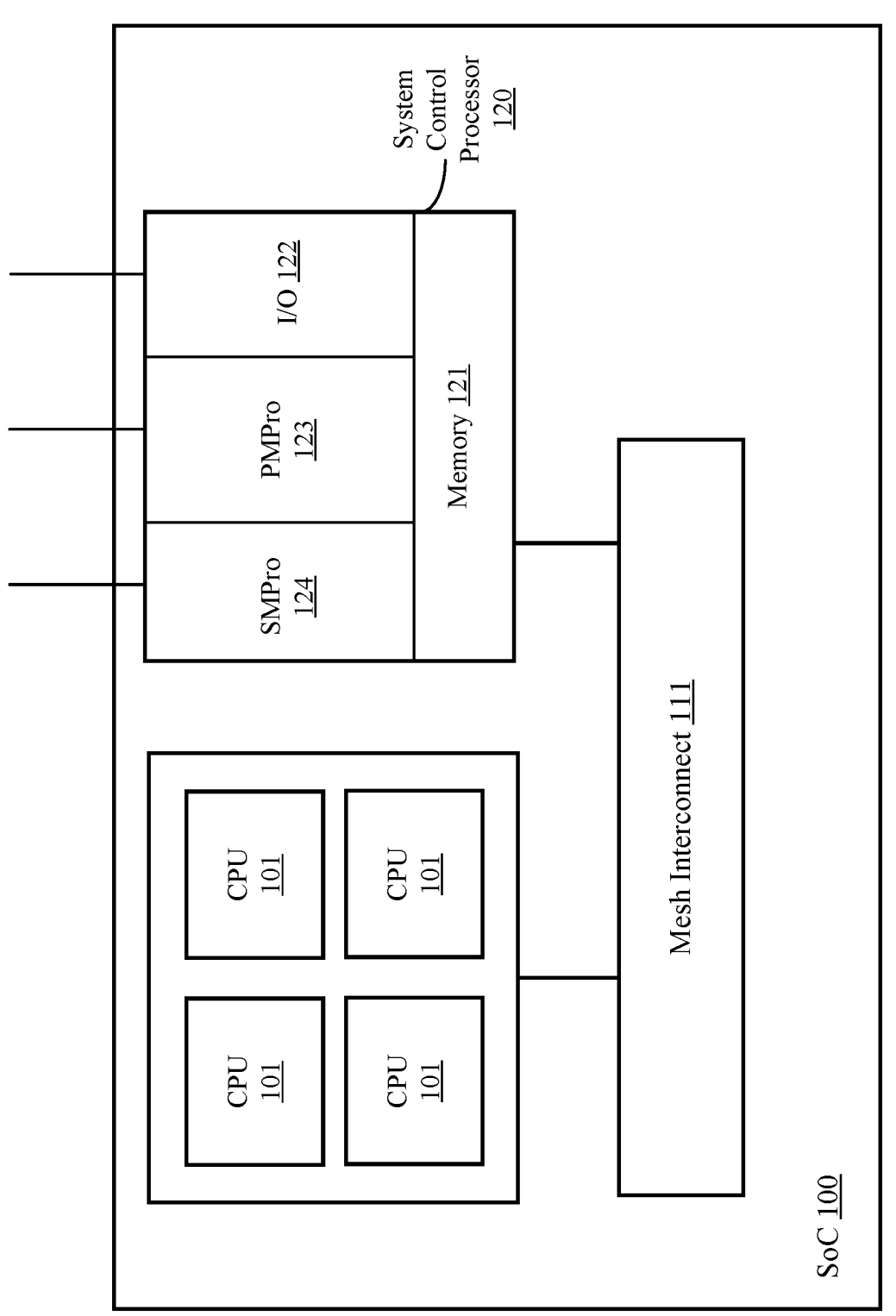
FIG. 1 is a diagram of a system on a chip (SoC) according to an implementation.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

The word "exemplary" is used herein to mean "serving as an example, instance, or illustration." Any implementation described herein as "exemplary" is not necessarily to be construed as preferred or advantageous over other embodiments. Likewise, the term "implementation" does not require that all implementations include the discussed feature, advantage, or mode of operation.

The terminology used herein describes particular implementations only and should not be construed to limit any implementations disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Various components as described herein may be implemented as application specific integrated circuits (ASICs), programmable gate arrays (e.g., FPGAs), firmware, hardware, software, or a combination thereof. Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to", "instructions that when executed perform", "computer instructions to" and/or other structural components configured to perform the described action.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

In FIG. 1, a system on a chip (SoC) 100 is illustrated with a set of central processing units (CPUs) 101 and a system control processor 120 that handles many of the utility functions of the SoC 100. The SoC 100 may include more than the illustrated four CPUs (e.g., 50 CPUs, 80 CPUs, or 120+ CPUs). The CPUs 101 are connected to system control processor 120 via a mesh interconnect 111 that forms a high-speed bus connecting each of the CPUs 101 to each other and connecting to other on-chip resources including memory (e.g., L3 cache), PCIe interfaces, I2C bus connections off chip, and other resources. Specifically, the mesh interconnect 111 may individually connect to the SMpro processor 124, the PMpro processor 123, input/output (I/O) ports 122 and memory 121 of the system control processor 120. The mesh interconnect 111, an I2C interface, or other connections may connect the system control processor 120 to CPUs 101 and other hardware of the SoC 100.

The PMpro processor (or sub-processor) 123 may perform the power management for the SoC 100 and may connect to one or more voltage regulators (VR) that provide power to the SoC 100. The PMpro processor 123 may receive voltage readings, power readings, and/or thermal readings and may generate control signals (e.g., dynamic voltage and frequency scaling—DVFS) to be sent to the voltage regulators. The PMpro processor 123 may provide the power for boot and may have specific power throttling and specific power connections for boot power to the system control processor (SCP) 120 and/or the SMpro processor 124. The PMpro processor 123 may receive power on control signals, voltage ramp signals, and other power control from other components of the system control processor 120 such as the SMpro processor 124 during boot up as hardware and firmware become activated on the SoC 100. These power-up processes and power sequencing may be automatic or may be linked to events occurring at or detected by the SMpro processor 124 and/or the PMpro processor 123.

The SMpro processor (or sub-processor) 124 may include a security processor 201 and a bootstrap controller 210 (as will be illustrated with respect to FIG. 2) and an I2C controller or other bus controller. The SMpro processor 124 may communicate with on-chip sensors, a baseboard management controller (BMC) off chip, and other external systems to provide control signals to external systems. The SMpro processor 124 may perform error handling and crash recovery for CPUs of the SoC 100 and may perform power failure detection, recovery, boot, and other fail safes for the SoC 100. The SMpro processor 124 manages the boot process and may include ROM and EPROM for safely storing firmware for controlling and performing the boot process. In addition, the SMpro processor 124 may store and execute the BIOS (if present) for the SoC 100. Thus, the SMpro processor 124 is responsible for the boot up of the SoC 100 and security features may be advantageously located on the SMpro processor 124.

The SMpro processor 124 may include on-board ROM (e.g., memory 121) and a trusted management module (TMM). The TMM may be implemented as hardware or firmware or a combination thereof. Indeed, the components of the SoC 100 may be divided into trusted components and non-trusted components, where the trusted components may be software components verified by certificate, or pure hardware components. Using these certificates and trusted components, the system control processor 120 may ensure that the boot process is secure. The TMM or the SMpro processor 124 may access various types of memory based on the security risk and stage of the boot. For instance, before security processes may be activated the SMpro processor 124 may operate based on immutable ROM and efuses.

Once more advanced operations are running to check the validity of code and provide software-level security measures, then the TMM or SMpro processor 124 may access RAM or non-trusted components of the SoC 100. The TMM may also output authentication failure flags or indicators and/or boot failure indicators to the baseboard management controller off-chip in the event that errors occur. As will be discussed in more detail with reference to FIG. 2, the efuse array 220 may provide the necessary instructions for fail over or secure boot options that enable external re-programming. Upon a successful authentication and power-on of the hardware switches, the bootstrap controller 210 or hardware switches therein may output a particular boot state. The TMM or bootstrap controller 210 may use/read this boot state to enable or disable functions and may operate different ROM/EEPROM/RAM code/instructions based on the boot state.

Figure 2:
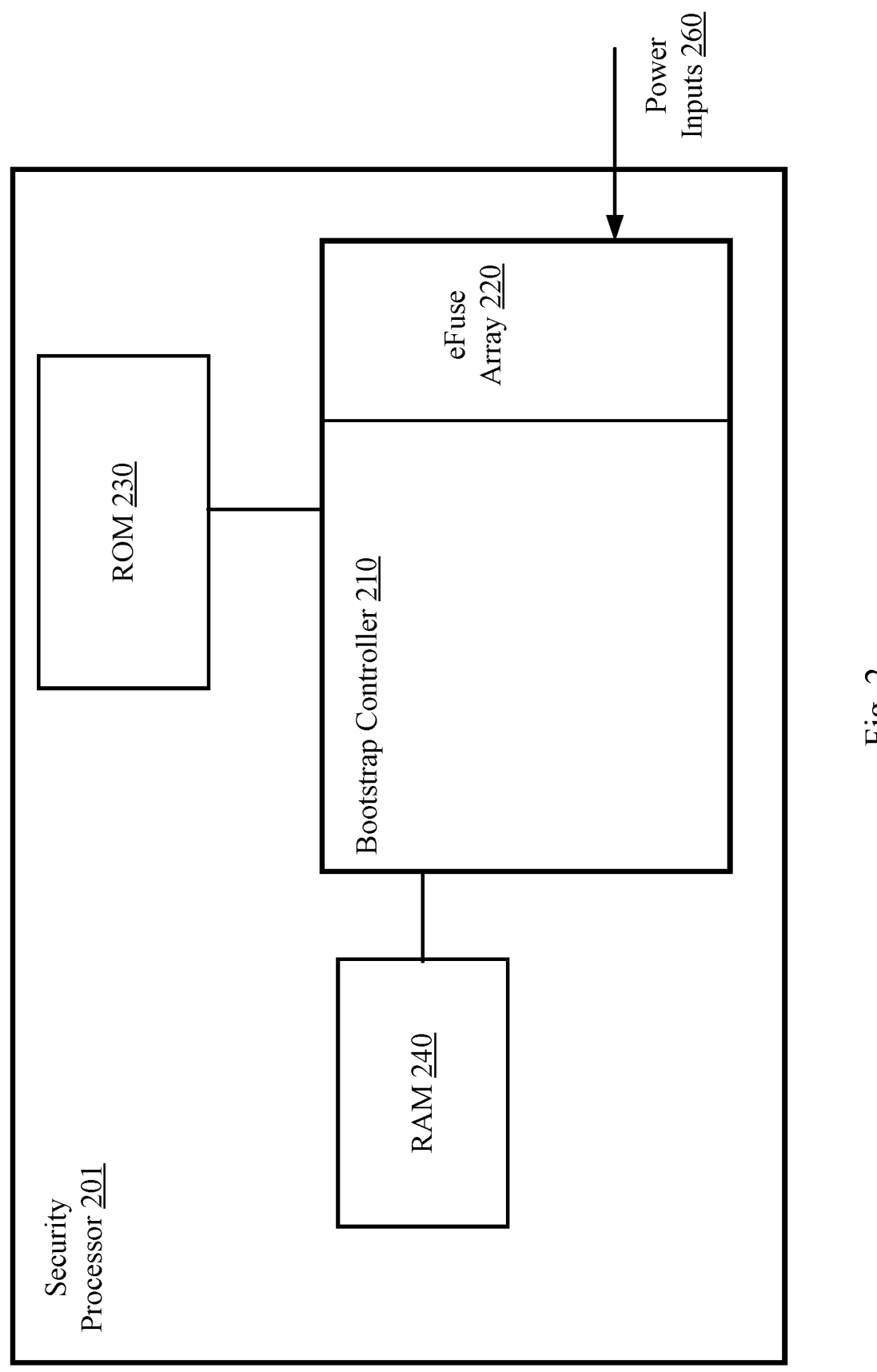
FIG. 2 is a diagram of a bootstrap controller according to an implementation.

In FIG. 2, the security processor 201 is illustrated along with the bootstrap controller 210 thereon. The bootstrap controller 210 and the security processor 201 may be dedicated silicon components on the SoC 100. The security processor 201 may host RAM 240 as on-board memory for boot or the RAM 240 may be a trusted part of memory 121. The ROM 230 may contain one or more instructions for the boot process and one or more certificates for signing and authenticating firmware during boot. That is, as noted above, the trusted elements of the SoC 100 may be authenticated via these certificates stored in ROM 230. The ROM 230 may contain instructions that are processed by the bootstrap controller 210 to initiate boot and firmware execution. These instructions may be loaded from ROM 230 into RAM 240 by the bootstrap controller 210 before being executed by the bootstrap controller 210 or security processor 201.

The bootstrap controller 210 or the security processor 201 may include hardware switches which may be logic gates (e.g., OR, XOR, NOR, AND, NAND), semiconductor switches, checksum functions, and other control logic in silicon. These hardware switches may be provided at the power inputs 260 and may connect to one or more pins of the SoC 100 to read if the pins are asserted. These hardware switches may determine boot flow at the start of the boot and may be the first components on the SoC 100 to be powered-on apart from (or after) the PMpro processor 123. The hardware switches may read one or more efuses of efuse array 220 which may operate as additional ROM and/or hardware coded values for boot modes. Furthermore, power inputs 260 may include an efuse over-voltage pin that is configured to provide voltage sufficient to blow efuses for programming. The efuses or efuse array 220 may be implemented as EPROM, EEPROM, FLASH, or other non-volatile or one-time programmable memory.

Upon boot, the bootstrap controller 210 and security processor 201 may be supplied with power. The bootstrap controller 210 may then access the ROM 230 via direct memory access (DMA) and may transfer the contents of the ROM 230 directly to RAM 240 for execution. One advantage of this read and transfer before the main boot is that after transfer of the trusted, immutable contents of ROM 230, the instructions in RAM 240 may be patched before execution. The patches for the ROM 230 may be stored in the efuse array 220 which may be programmed after manufacture, and which is secure and immutable after programming. The patches may be configured to replace or bypass one or more instructions or certificates of ROM 230. The bootstrap controller 210 may apply a patch by copying ROM 230 to RAM 240, reading the patch from the efuse array 220, and writing the patch to RAM 240 before executing the boot process. This process of applying the patch is described in more detail with respect to FIG. 6. These steps are taken very early in the boot process or essentially upon power-on of the bootstrap controller 210.

Figure 3:
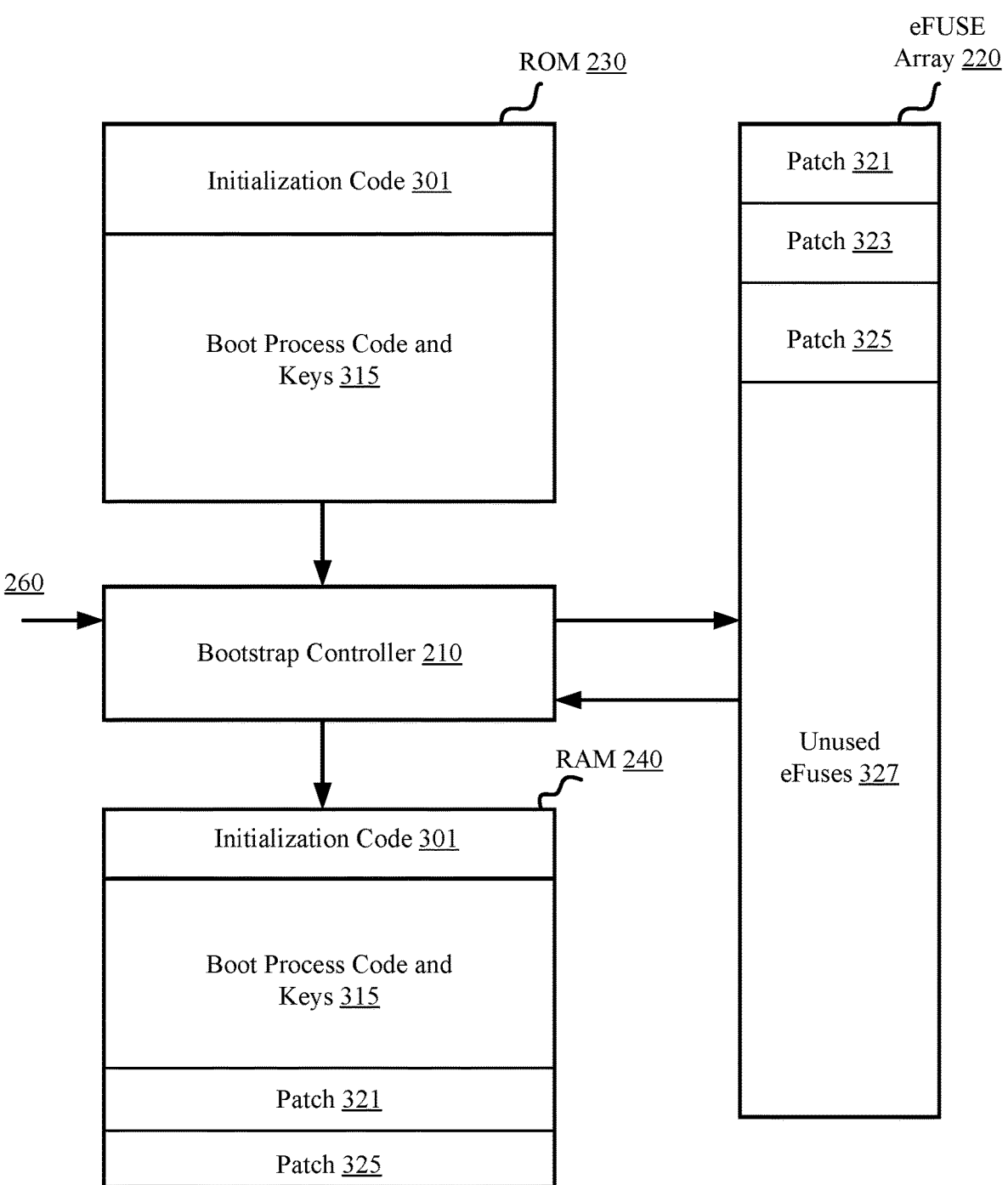
FIG. 3 is a flow diagram of a portion of a boot process according to an implementation.

In FIG. 3, the flow of information between components upon boot is illustrated. At boot the contents of ROM 230 are copied into RAM 240. As shown, the initialization code 301 for boot and the boot process code and keys 315 are copied to RAM 240. The initialization code 301 may be executed by the bootstrap controller 210 to complete initial steps of the boot process such as checking for asserted pins, checking for efuse flags, and checking for valid patches in the efuse array 220. As shown the efuse array 220 may be largely unused at any given point and reserved for future patches. Indeed, at manufacture, the efuse array 220 allocated for patches may be empty. Patches may then be added later (in the field) as described further with respect to FIG. 5. Since the bootstrap controller 210 is the processor executing the early boot steps including validation of its own firmware, the bootstrap controller 210 is the hub of the information flows. The bootstrap controller 210 is also initialized by the power input 260 and then supplies power to read the ROM 230.

If during initialization via the initialization code 301, the bootstrap controller 210 determines that the efuse array 220 has valid patches for the ROM 230, the bootstrap controller 210 may retrieve those patches and write them into the appropriate position in the RAM 240. For example, here patch 321 and patch 325 may be valid patches and patch 323 may be an invalid or revoked patch. Accordingly, as the bootstrap controller is reading the efuse array 220, it may sequentially read out patch 321 into RAM 240 until it reaches patch 323. At patch 323, a signed bit of the patch header may be blown to indicate the patch is now invalid. The patch header may also contain the length of the patch payload which can now be skipped by the bootstrap controller 210 when reading the efuse array 220. After the skipping of patch 323, the bootstrap controller 210 may arrive at patch 325 and read that patch into RAM 240. The bootstrap controller 210 may then determine that no further patches are present in the efuse array 220.

Figure 4A:
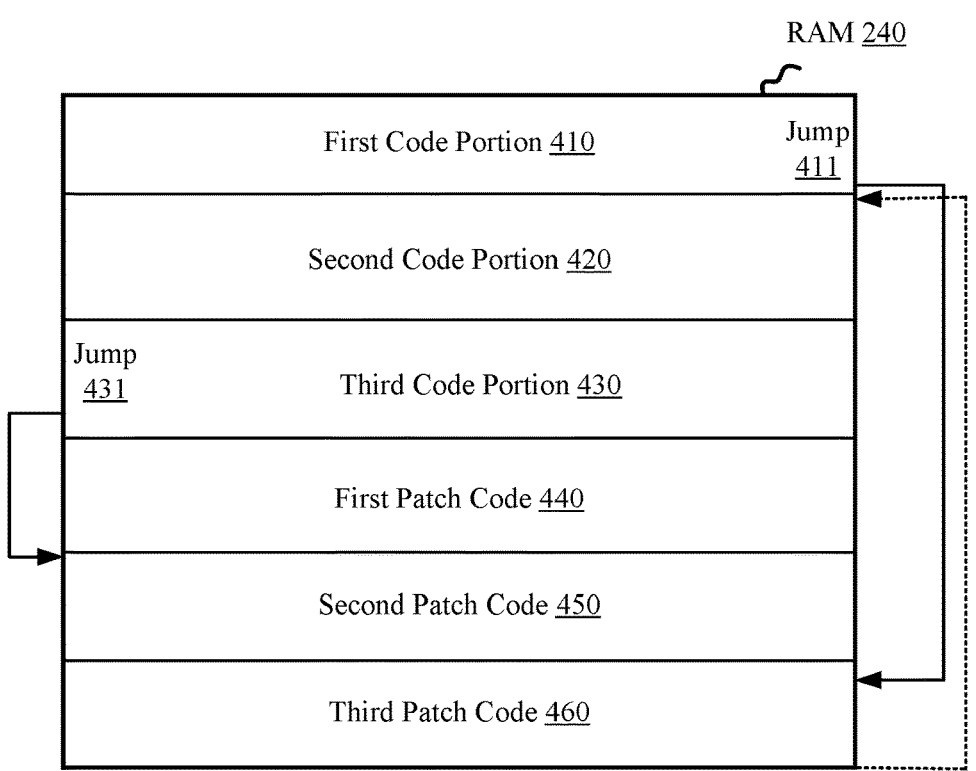
FIG. 4A is a diagram of RAM memory after loading patches according to an implementation.
Figure 4B:
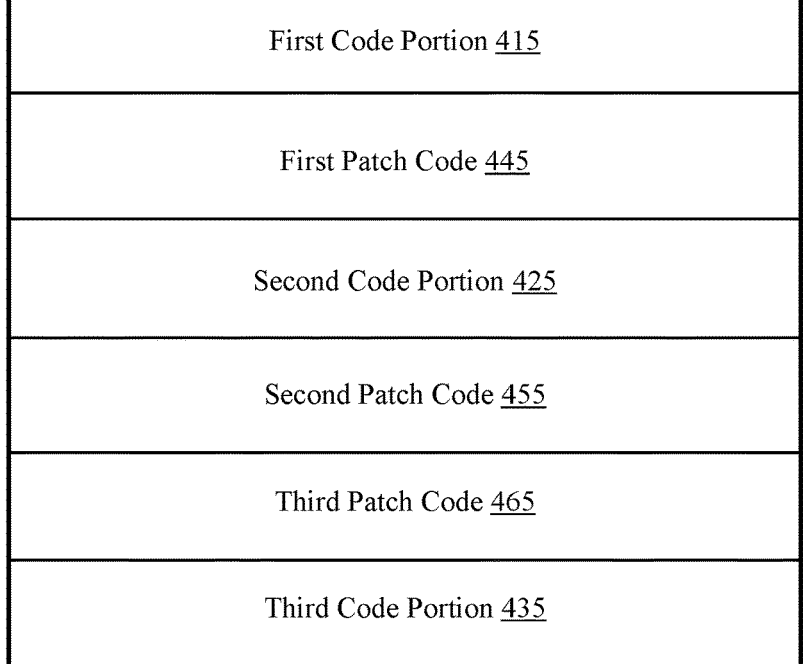
FIG. 4B is a diagram of RAM memory after loading patches according to an implementation.

The RAM 240 is illustrated with valid patches 321 and 325 appended to the boot process code and keys 315 as an example. Other positions for the patches in memory is contemplated as shown in FIG. 4A-4B. Indeed, each patch may include a memory address or index that corresponds to a position in RAM 240 that is fixed or predictable due to the immutable nature of the boot process. Upon power-on, the original ROM embedded in silicon at manufacture may be copied in total by the bootstrap controller 210 into the RAM 240 as originally designed. The bootstrap controller 210 may then copy the patches into RAM 240 to overwrite or skip sections of the original ROM instructions so that the patch is executed instead.

For example, in order to replace a segment of ROM instructions that, when copied into RAM 240, begins at a first address, the patch may provide the same address as its starting point such that the bootstrap controller 210 overwrites the segment of ROM instructions with the patch starting at the first address. If the patch code is smaller than the segment of ROM code to be replaced, then the remaining space may be filled in the patch with NO-OP instructions (i.e., instructions that do no operation (NO-OP)). If the patch code is larger than the segment of ROM instructions to be replaced, then the patch may write a jump instruction at the first address where the segment of ROM instructions to be replaced begins and write the rest of the patch in RAM 240 following the entire block of ROM instructions (as illustrated). Upon execution, the code in RAM would reach the jump instruction, jump to a memory address after the entire block of ROM instructions to execute the patch stored there, and then return to the line after the jump instruction. The rest of the replaced segment of ROM instructions after the jump instruction may be filled with NO-OP instructions to prevent any execution of the replaced ROM instructions (i.e., ensure full overwrite). After execution of a sub-routine that has been jumped to (e.g., located at the position identified in the jump instruction, the process may skip a conditional upon return from the sub-routine.

In a similar way, the ROM 230 may include keys and boot process code 315, where one or more of the keys may be replaceable by overwrite once transferred to RAM 240. In this case, the replacement key may be the same size as the original key. That is, if a key in ROM used to sign firmware of the bootstrap controller 210 becomes compromised, the key may be replaced by a patch containing a replacement key in the payload of the patch. Such replacement may be accomplished by overwriting the original key as copied into RAM 240 with a key copied from the efuse array 220. On the other hand, a replacement key may be larger or smaller than the original key (e.g., the modified firmware to be authenticated is larger or smaller). In this case, the one or more instructions in the ROM (e.g., boot process code and keys 315) that access this key may be overwritten with instructions to access a key stored elsewhere in RAM so that the new firmware can be authenticated by the new larger or smaller key.

The ROM 230, and the initialization code 301 and the boot process code and keys 315 thereof, may be used to authenticate the firmware of the security processor 201, the firmware of the bootstrap controller 210, the components of the TMM, and other trusted elements of the SoC 100. The firmware of the security processor 201 and the firmware of the bootstrap controller 210, however, may be modified both maliciously and for improvement purposes. In the case of improving or updating the firmware authenticated at boot by keys in ROM 230, new keys may be inserted for authentication at boot so that the new firmware is accepted and not treated as malicious. While ROM instructions cannot be modified, once they are copied to RAM 240, the ROM keys and instructions can be replaced from other secure sources like efuse array 220. Thus, first the ROM is copied to RAM and then patches are applied to enable authentication of the altered firmware.

In FIG. 4A an exemplary series of patches are illustrated as being applied to the ROM instructions in RAM 240. In some aspects, the RAM 240 may be a cache or tightly coupled memory of the bootstrap controller 210 or security processor 201. Specifically, the original ROM instructions are illustrated as first code portion 410, second code portion 420, and third code portion 430. Additionally, patches read into RAM from the efuse array 220 are illustrated as first patch code 440, second patch code 450, and third patch code 460. The ROM instructions may be executed sequentially beginning at the top of the box signifying the RAM 240 with first code portion and executing until a jump 411 is reached that has overwritten an original ROM instruction (as a part of the first patch). The jump 411 transfers program flow to the third patch code 460 so that the patch is executed before execution returns to just after the jump instruction (as indicated by the return arrow). Any instructions after the jump in the first code portion 410 that are no longer desired (e.g., because their function has been replaced by the patch code), may be overwritten with NO-OP instructions. Accordingly, the third patch code 460 executes and then execution may return to the original ROM instructions of the second code portion 420.

As illustrated the second code portion 420 may execute completely, and execution, by the bootstrap controller 210, may continue to third code portion 430 and that may execute until another jump 431 is reached. This jump 431 takes the execution to second patch code 450 which executes and may then return to just after the jump instruction. The rest of the third code portion 430 may complete execution such that the second patch code 450 constitutes added code to the boot process. The execution may then continue to the first patch code 440 which may replace one or more original ROM instructions that would have followed third code portion 430 but have been overwritten. Where the end of the ROM instructions in RAM is overwritten by a patch, that patch at the end may not be limited by the dimensions or sequencing of the original ROM. The series of jumps illustrated may enable the third patch code 460 and the second patch code 450 to be larger or longer (more instructions) than the replaced (overwritten) original ROM code. A jump may be a memory branch, jump, pointer, or other equivalent machine language instruction. A further patch may replace one or more of the NO-OP instructions with another jump in order to execute further code.

The RAM 240 of FIG. 4B is patched as well. In this example of patching ROM-sourced instructions in RAM, the original ROM instructions include first code portion 415, second code portion 425, and third code portion 435. The patches applied to the ROM instructions and data in RAM 240 include first patch code 445, second patch code 455, and third patch code 465. The bootstrap controller 210 may proceed sequentially through the stack of instructions and data (e.g., top to bottom). In this example, the first patch code 445, second patch code 455, and third patch code 465 overwrite original ROM instructions and data between first code portion 415 and second code portion 425 and overwrite original ROM instructions and data between second code portion 425 and third code portion 435. The patch instructions overwritten on these portions may be the same size or smaller than the replaced instructions. If the patch instructions written are smaller than the replaced instructions, then the rest of the instruction space may be filled with NO-OP instructions and/or the original instructions not directly overwritten may be skipped by a memory instruction or pointer.

The patches in FIG. 4A or 4B may be instructions or keys. In parallel with the instructions in RAM 240 of FIGS. 4A and 4B, the bootstrap controller 210 may be executing firmware that is sequentially authenticated by one or more keys in RAM 240. Any updated firmware may correspond with updated keys provided as patches (e.g., first patch code 445). Thus, small changes in instructions and keys in the ROM instructions may enable large changes in firmware operation without requiring equivalent space in efuse array 220.

Figure 5:
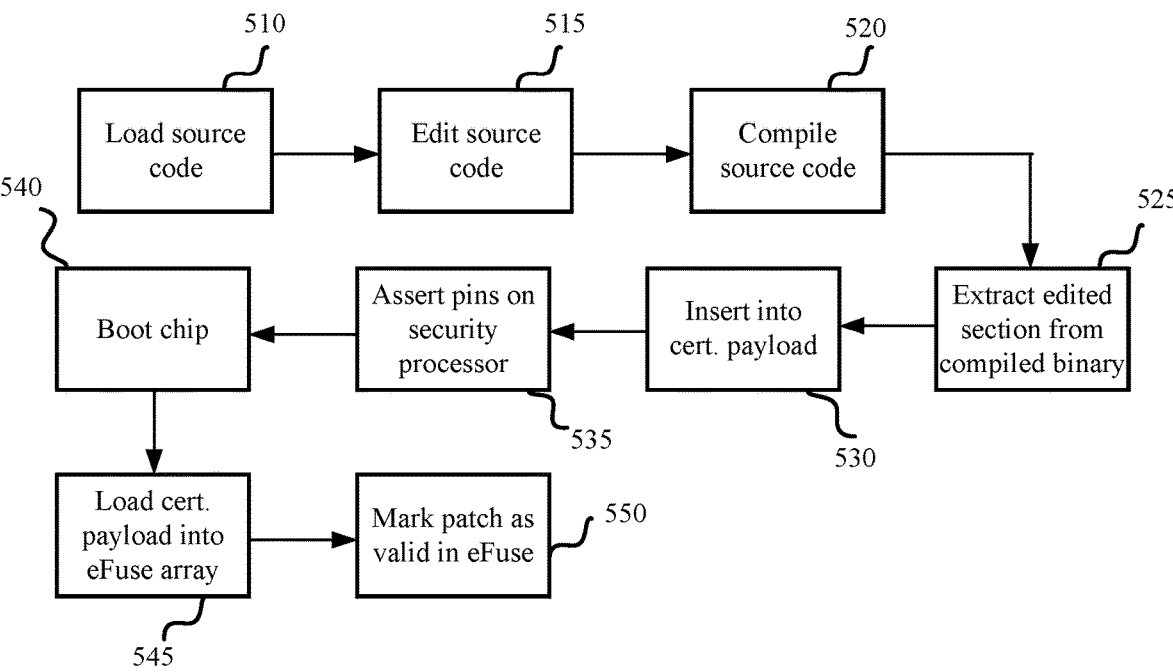
FIG. 5 is a flow diagram of a process to install patches according to an implementation.

In FIG. 5 a process for developing and installing a patch for the ROM instructions is illustrated. At 510, a developer may load the source code of the ROM instructions that have been burned into silicon on the SoC 100 at manufacture (e.g., original ROM instructions). At 515, the source code may be edited in a similar way as when the original source code was developed (e.g., in a graphical user interface). At 520, the source code may be compiled into binary or machine-readable instructions and may be compiled by a same compiler as the original ROM instructions. At 525, the edited portion of the source code may be identified in the compiled binary and extracted. The size, placement, filler needed, and other characteristics of the binary code segment extracted may be placed in a header. At 530, the header and the extracted binary segment (patch) may be combined with a certificate authenticating the patch by inserting the patch in a certificate payload. The certificate may operate to authenticate with the bootstrap controller 210 such that it enters a programming mode for the efuses. During boot into the special boot mode for programming the efuses, the bootstrap controller 210 may operate based only on original ROM instructions (patches not read in) or may apply patches in this situation as well. If patches are not read in during this mode but can be programmed, then even the ROM instructions for the patch writing process may be able to be patched.

At 535, an overvoltage pin and a special boot pin may be asserted for programming of the certificate payload (which may include providing permission for the bootstrap controller to unlock write capability for the effuse array 220, in one aspect). At 540, the SoC 100 may be powered on such that at least the security processor 201 may be powered on. Upon the boot of the chip at 540, the asserted pins may be recognized by initial ROM-based instructions and the bootstrap controller 210 may read in the certificate payload for the patch and authenticate it using keys in ROM. Once the certificate has been authenticated, at 545, the bootstrap controller 210 may load (burn-in or blow) the certificate payload into the efuse array 220 using voltage received at an overvoltage pin that is powered for this purpose. Then at 550, the bootstrap controller 210 may verify the programming of the efuses (e.g., by integrity hash) and mark the patch as valid in the efuse array 220 (e.g., by signed bit of the variable length record of the encoding in the efuse array).

Figure 6:
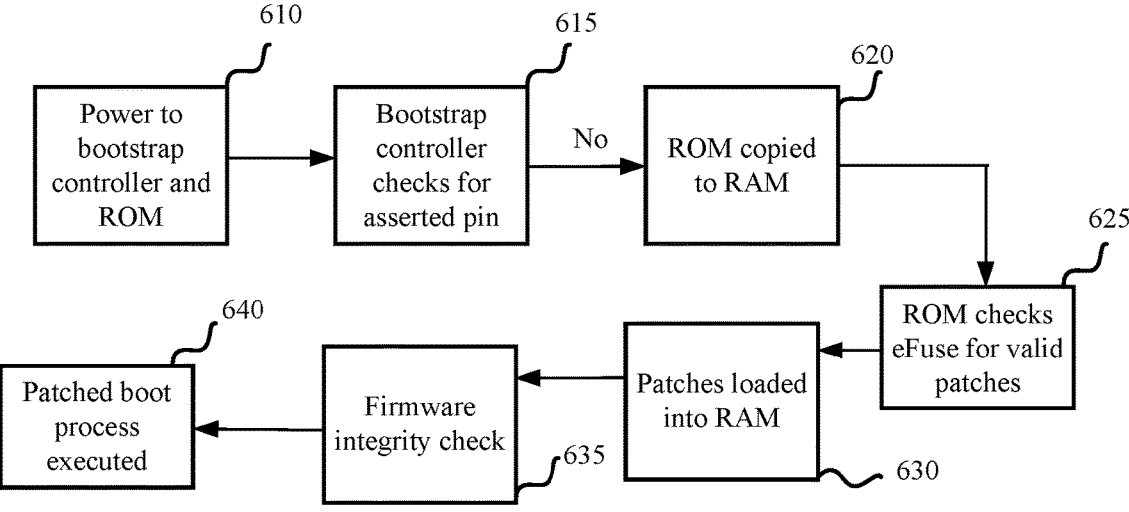
FIG. 6 is a flow diagram of a process to apply patches on boot according to an implementation.

In FIG. 6 the process of booting and applying the installed patches is described in more detail. As noted previously, the bootstrap controller 210 and a few associated hardware switches may receive power first upon power on of the SoC 100. The hardware switches may control various debug modes that may be enabled (via asserted pins) before system boot would begin. If such debug modes are not enabled, then the main system boot process of the bootstrap controller 210 may be initiated at 610 with power to the bootstrap controller and ROM. Then at 615, the bootstrap controller 210 may check for an asserted pin (e.g., special boot pin) for programming of the efuses as described above. In this process of FIG. 6, this pin is not asserted. Accordingly, at 620, the original ROM is copied to RAM by the direct memory access of the bootstrap controller 210. Then at 625, the bootstrap controller 210, operating off of ROM instructions (or ROM in RAM), checks the efuse array 220 for valid patches. At 630, any valid patches are loaded into RAM in the appropriate places as described previously. Then once the ROM in RAM is patched and any possible updates to keys have been applied, the bootstrap controller 210 may perform an integrity check of its firmware at 635. This integrity check may be performed before any firmware is executed. After the firmware is authenticated by the original or updated/patched keys, a patched boot process may be executed, at 640. If no patches are present in the system and no pins are asserted, then ROM may be copied into RAM, the firmware is authenticated, and then executed.

In FIG. 7 an exemplary structure of a patch as encoded in efuses is illustrated. The patch 700 may include a header and a payload. The patch header may have a length of four (4) bytes with an offset of zero (0) bytes, though other lengths and offsets are contemplated (e.g., 1 leading bit or an 8-byte length). The offset may designate the beginning of a variable length record within the patch. The first byte (0:7 bits) of the header may define a total patch length in 16-bit half words, bytes, bits, or other units of digital data. The next byte (7:15 bits) may define a length or number of instructions to be filled with NOP (NO-OP) instructions after the operating instructions in the patch. This may save space in the efuse array 220 by not requiring the recording of NO-OP instructions directly in efuses, so that this placeholder byte can be used instead to define the space to be filled when the patch is copied to RAM. The next two bytes of the header (16:31 bits) may define the patch offset in the TCM or RAM. That is, this piece of the header may define placement of the patch in RAM or the placement of the patch such that the correct instructions are overwritten. The patch payload, which may include instructions or cryptographic keys for the boot process, may begin at an offset of four (4) bytes within patch 700. The code, which may be sized from 0 to 254 half-words, may replace the contents of RAM such as an I-TCM (internal tightly coupled memory) at the offset specified in the header. A payload may be zero bytes if the patch is being used not to add code but to replace existing ROM instructions with NO-OPs. The patch 700 may be a signed-bit variable length record where if the signed bit is non-zero, the patch is invalid.

Figure 8:
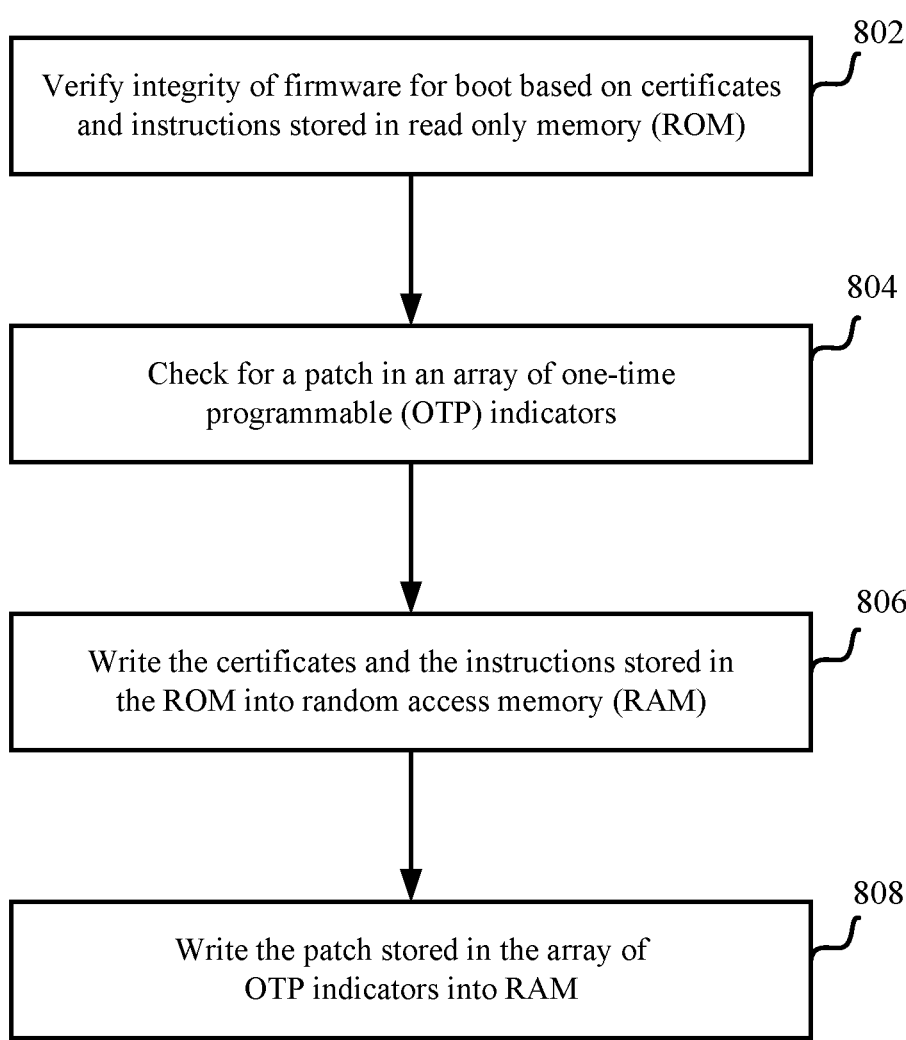
FIG. 8 is a flow diagram of a process for patching ROM code according to an implementation.

FIG. 8 illustrates an example method 800 of applying a patch to ROM-sourced instructions, according to aspects of the disclosure. At 802, the boot process 800 may verify integrity of firmware for boot based on certificates and instructions stored in read only memory (ROM). At 804, the boot process 800 may check for a patch in an array of one-time programmable (OTP) indicators. At 806, the boot process 800 may write the certificates and the instructions stored in the ROM into random access memory (RAM). At 808, the boot process 800 may write the patch stored in the array of OTP indicators into RAM. In an aspect, method 800 may be performed by a device (e.g., any of the processors described herein). In an aspect, operations 802-808 may be performed by the bootstrap controller 210, the security processor 201, SoC 100, memory 121, ROM 230, RAM 240, and/or efuse array 220, any or all of which may be considered means for performing this operation.

As will be appreciated, a technical advantage of the method 800 is post-manufacture patching of ROM code and data for an updated secure boot.

Figure 9:
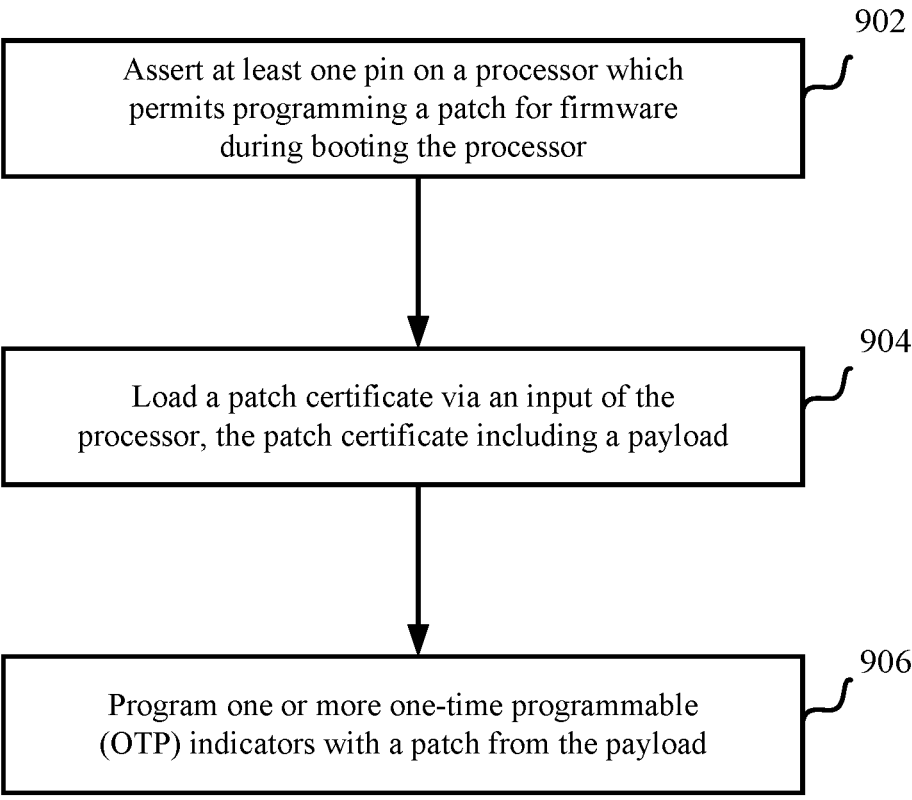
FIG. 9 is a flow diagram of a process for patching ROM code according to an implementation.

FIG. 9 illustrates an example method 900 of installing a patch for ROM in an efuse array, according to aspects of the disclosure. At 902, the boot process 900 may assert at least one pin on a processor which permits programming a patch for firmware during booting the processor. At 904, the boot process 900 may load a patch certificate via an input of the processor, the patch certificate including a payload. At 906, the boot process 900 may program one or more one-time programmable (OTP) indicators with a patch from the payload. In an aspect, method 900 may be performed by a device (e.g., any of the processors described herein). In an aspect, operations 902-906 may be performed by the boot-strap controller 210, the security processor 201, SoC 100, memory 121, ROM 230, RAM 240, and/or efuse array 220, any or all of which may be considered means for performing this operation.

As will be appreciated, a technical advantage of the method 900 is post-manufacture patching of ROM code and data for an updated secure boot.

Those having skill in the art will appreciate that although certain aspects have been illustrated in the Figures, other aspects are within the scope of the teachings of the present disclosure. In the illustrated aspects, a jump instruction is used to change the flow of instructions, but in other aspects, a branch instruction or other change-of-flow instruction may be used instead of a jump instruction. Further, although in the illustrated aspects, certificates and instructions have been described as being programmable, other kinds of security metadata such as signatures, keys, key hashes, hashes, and other secrets may be programmed in a similar fashion, and such security metadata is contemplated to be within the meaning of certificate as used herein.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more opera-tional steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and tech-niques. For example, data, instructions, commands, infor-mation, signals, bits, symbols, and chips that may be refer-enced throughout the above description may be represented by voltages, currents, electromagnetic waves, magnetic fields or particles, optical fields or particles, or any combi-nation thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A method of securely booting with patched firmware, the method comprising:

verifying integrity of firmware for boot based on certifi-cates and instructions stored in an immutable read only memory (ROM), wherein the ROM is included as part of an apparatus for secure boot, and wherein the instructions are stored in the ROM when the apparatus for secure boot is manufactured;

checking for a patch in an array of one-time program-mable (OTP) indicators;

writing the certificates and the instructions stored in the ROM into random access memory (RAM); and writing the patch stored in the array of OTP indicators into RAM.

2. The method of claim 1, further comprising:

overwriting at least a portion of the certificates or the instructions in the RAM with the patch from the array of OTP indicators.

3. The method of claim 1, wherein the patch includes information to replace one or more ROM instructions or one or more ROM certificates.

4. The method of claim 1, wherein the patch includes one or more instructions and one or more keys.

5. The method of claim 1, wherein the patch is defined in the array of OTP indicators, the patch indicating a starting point in the RAM and a length of the patch in a header, wherein the patch includes a signed-bit length field that indicates whether the patch is valid or not valid, wherein if the patch is valid, the patch is read into the RAM, and wherein, if the patch is not valid, a length indicated in the signed-bit length field is skipped in the array of OTP indicators.

6. The method of claim 1, wherein the array of OTP indicators are efuses, EEPROM, or Flash memory.

7. The method of claim 1, wherein the patch in the RAM includes a change-of-flow instruction to a point in the RAM where one or more instructions of the patch are stored.

8. The method of claim 1, wherein the patch in the RAM includes one or more NO-OP instructions that replace or overwrite one or more instructions of the instructions origi-nally stored in ROM.

9. A apparatus for secure boot, the apparatus comprising:

a read only memory (ROM) storing one or more certifi-cates and instructions, wherein the ROM is immutable, and wherein the instructions are stored in the ROM when the apparatus for secure boot is manufactured;

an array of one-time programmable (OTP) indicators;

a bootstrap controller connected to the ROM and the array of OTP indicators; and random access memory (RAM) connected to the boot-strap controller, wherein the bootstrap controller is configured to:

verify integrity of firmware for boot based on certifi-cates stored in ROM, check for a patch in the array of OTP indicators, write the one or more certificates and instructions in ROM into RAM, and write the patch into the RAM.

10. The apparatus of claim 9, wherein the bootstrap controller is configured to:

overwrite at least a portion of the certificates or the instructions in the RAM with the patch from the array of OTP indicators.

11. The apparatus of claim 9, wherein the patch includes information to replace one or more ROM instructions or one or more ROM certificates.

12. The apparatus of claim 9, wherein the patch includes one or more instructions and one or more keys.

13. The apparatus of claim 9, wherein the patch is defined in the array of OTP indicators, the patch indicating a starting point in the RAM and a length of the patch in a header, wherein the patch includes a signed-bit length field that indicates whether the patch is valid or not, wherein if the patch is valid, the patch is read into the RAM, and wherein, if the patch is not valid, a length indicated in the signed-bit length field is skipped in the array of OTP indicators.

14. The apparatus of claim 9, wherein the array of OTP indicators are efuses, EEPROM, or Flash memory.

15. The apparatus of claim 9, wherein the patch in the RAM includes a change-of-flow instruction to a point in the RAM where one or more instructions of the patch are stored.

16. The apparatus of claim 9, wherein the patch in the RAM includes one or more NO-OP instructions that replace or overwrite one or more instructions of the instructions originally stored in ROM.

\*    \*    \*    \*    \*